US009547560B1

(12) United States Patent
Lee

(10) Patent No.: US 9,547,560 B1
(45) Date of Patent: Jan. 17, 2017

(54) AMORTIZED SNAPSHOTS

(71) Applicant: Amazon Technologies, Inc., Seattle, WA (US)

(72) Inventor: Kerry Quintin Lee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 14/752,711

(22) Filed: Jun. 26, 2015

(51) Int. Cl.
*G06F 11/14* (2006.01)

(52) U.S. Cl.
CPC ....... *G06F 11/1451* (2013.01); *G06F 11/1435* (2013.01); *G06F 11/1464* (2013.01); *G06F 2201/84* (2013.01)

(58) Field of Classification Search
None
See application file for complete search history.

(56) References Cited

U.S. PATENT DOCUMENTS 7,111,026 B2 * 9/2006 Sato .................. G06F 17/30008
7,315,965 B2 * 1/2008 Stager ................ G06F 11/2074 714/13
8,677,052 B2 * 3/2014 Patterson ............. G06F 3/0611 711/101
9,110,600 B1 * 8/2015 Brooker .............. G06F 11/1458
2004/0268067 A1 * 12/2004 Yamagami .......... G06F 11/1471 711/159
2005/0015416 A1 * 1/2005 Yamagami .......... G06F 11/1471
2005/0022213 A1 * 1/2005 Yamagami .......... G06F 11/1471 719/328
2012/0110287 A1 * 5/2012 Han ...................... G06F 3/0617 711/162
2013/0007388 A1 * 1/2013 Kito ...................... G06F 3/0608 711/162
2014/0019698 A1 * 1/2014 Pittelko ............... G06F 11/1451 711/162
2014/0214771 A1 * 7/2014 Ogata ................. G06F 11/1446 707/649

* cited by examiner

*Primary Examiner* — Kevin Verbrugge
(74) *Attorney, Agent, or Firm* — Davis Wright Tremaine LLP

(57) ABSTRACT

A system and method for generating and storing at least one snapshot update. The system and method comprising determining a first set of blocks including blocks that have changed since a time of a previous snapshot, determining a second set of blocks based at least in part on a predetermined amount, generating at least one snapshot update of a volume based at least in part on a combination of the first set of blocks and the second set of blocks, and storing the at least one snapshot update.

20 Claims, 8 Drawing Sheets

AMORTIZED SNAPSHOTS

BACKGROUND

Organizations concerned about mitigating the risk of data loss often back up electronic data as a hedge against data loss or corruption. That is, in an event where data is lost, corrupted, overwritten, or erased, then the data may be restored or the data may be rolled back to a known good state from a stored backup. In addition, some organizations back up data to comply with regulations that require retention of some types of data for a certain amount of time. In order to save time and storage, a full backup may be made periodically with incremental backups performed thereafter. However, in computing environments where full backups are infrequent or where incremental backups are frequently performed, the number of backups to maintain and the storage space required to maintain them can become quite large. Furthermore, restoring data and/or rolling data back to a previous state in such environments can require traversing a large number of these backups sequentially, which can be very time-consuming.

BRIEF DESCRIPTION OF THE DRAWINGS

Various embodiments in accordance with the present disclosure will be described with reference to the drawings, in which.

DETAILED DESCRIPTION

Figure 1:
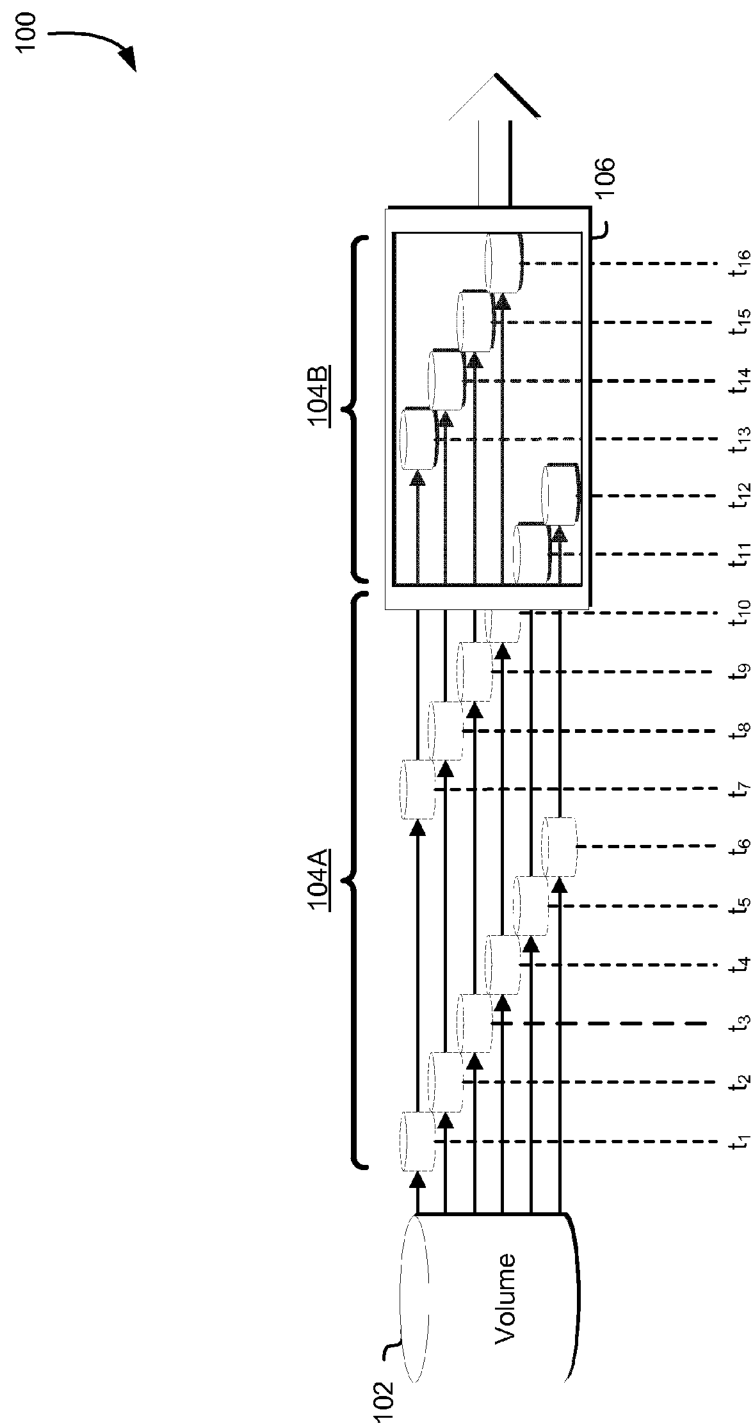
FIG. 1 illustrates an example of snapshot updates of a volume and a sliding window in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for performing rolling snapshot updates, having a maximum depth, for a storage volume. The techniques described include obtaining a snapshot manifest, incrementing a snapshot count, and determining first and second subsets of the set of data objects for the volume. The snapshot manifest may be a listing of a set of data objects stored within the storage volume. The listing may be entries in a file, database, memory, or other medium and/or data structure. The listing may include location information that indicates where the data objects of the set of data objects may be found within the storage volume, within a rolling snapshot update, or at some other location. Thus, the location information may include information that uniquely distinguishes each snapshot, volume, database entry, or other storage location (e.g., such as a unique identifier, name, storage device and logical block address, database table and record identifier, etc.).

The snapshot count may be any method for keeping track of the current or most recent snapshot update and the active snapshot updates within the sliding window representing the maximum snapshot depth. For example, the snapshot count may be a counter that is incremented for each snapshot update. Alternatively, the snapshot count may be a pointer that is updated for each snapshot update, or may be information configured according to some other scheme for keeping track of current and past partial and/or full snapshots of the volume. The first subset of data objects may be a subset of the data objects of the volume that have changed or are new (referred to as an "incremental set" or "change set") since a time of a previous full snapshot or snapshot update. The second subset of data objects may include a proportion of set of the data objects of the volume, regardless of whether the data objects in the second subset are new or have changed since a time of the previous snapshot. The proportion may be determined by the maximum snapshot depth; for example, a maximum snapshot depth of five may result in a second subset comprised of 20% (i.e., ⅕th) of the set of data objects of the volume. Note that the second subset may comprise data objects mutually exclusive from previous second subsets for snapshots up to the maximum snapshot depth. In other words, for a maximum snapshot depth of five, the data objects may be the first 20% portion of the data objects may include different data objects than the second, third, fourth, and fifth portions of data objects, the second 20% portion may include different data objects than the first, third, fourth, and fifth portions of data objects, and so on. Data objects in this context may refer to data storage units, data files, database records, or other data objects. In some examples, "data storage units" may refer to blocks in a block-level storage volume, chunks/collections of one or more blocks, portions of blocks, or some other unit of division of a data store. Data storage units may have a fixed size and the data contained within the data storage units may be one or more data files, one or more portions of data files, or some other data format.

The techniques described further include obtaining the first subset of data objects and the second subset of data objects from their respective locations indicated by the location information in the manifest, generating a snapshot update of these data objects, and storing the snapshot update. The snapshot update may be one or more files containing copies of the data objects, in compressed or uncompressed format, and may include metadata indicating where the data objects should be located relative to each other or relative to a location (e.g., starting location) in the volume. The snapshot update may be stored in a database, within another volume, or some other storage structure on a storage device different than a storage device hosting the volume.

Described and suggested techniques improve the field of computing, specifically the field of data backup and recovery, by backing up data using snapshot updates of data that include incremental and proportional portions. Additionally, described and suggested techniques improve the efficiency of data restoration by limiting the number of snapshots required to restore a full volume without having to perform periodic full snapshots (also referred to as a full re-base). Moreover, described and suggested techniques are necessarily rooted in computer technology in order to overcome problems specifically arising with reducing the resources required to store incremental snapshots by performing partial full snapshots (also referred to as a rolling re-base) in conjunction with incremental backups up to a maximum snapshot depth.

FIG. 1 is a representation of an embodiment 100 of the present disclosure. As illustrated in FIG. 1, the representation depicts a technique for snapshotting a volume 102 by capturing snapshot updates 104A-04B over time. In some examples, a "snapshot update" may refer to copy of a portion of a volume at a particular point in time. A snapshot update of the present disclosure may include incremental data (which may also be referred to as a "change set") that includes data that is new or has changed since a previous snapshot (full snapshot or snapshot update) was captured. In embodiments, the incremental data is caused to be pushed from the volume by a customer owner of the volume (e.g., via an application programming interface call) to the system storing the snapshots of the present disclosure. In other implementations, the system performing the snapshot updating is authorized and configured to copy the incremental data directly from the volume on its own. The snapshot update may further include a "proportional" portion (which may be referred to as a "mandatory set") which may include a copy of a certain portion or proportion of the entire volume. In some embodiments, the proportional portion may be pushed, as with the incremental portion, by the client to the system performing the snapshot updating. In other embodiments, the system performing the snapshot updating is configured to obtain the proportional portion directly from the volume. Additionally or alternatively, in some implementations, the system performing the snapshot updating obtain the proportional portion from previous snapshot updates. In some embodiments, the "proportion" of the proportional snapshot can vary from snapshot to snapshot.

Each of the snapshot updates 104A-04B can be seen to have been captured at a different point in time. For example, the first snapshot update of the snapshot updates 104A-04B can be seen as being captured at time $t_1$, the second snapshot update of the snapshot updates 104A-04B can be seen as being captured at time $t_2$, and so on up to the most recent captured snapshot of the snapshot updates 104A-04B captured at time $t_{16}$. In some examples, the term "snapshot depth" (which may also be referred to simply as "depth") may refer to how many snapshot updates 104A-04B, at most, will be needed for restoring the volume 102 to a current state; in other words, the snapshot depth reflects the size of the sliding window 106, and may be a predetermined value that acts an upper limit to the number of active snapshots 104B in the sliding window 106. The representation shows the embodiment 100 of the present disclosure having a snapshot depth of six; that is, the embodiment 100 is configured such that the volume 102 can be restored in full using only six consecutive snapshots of the snapshot updates 104A-04B. The sliding window 106 indicates the active snapshot updates 104B; that is, the six most recent snapshot updates of the depicted embodiment.

The volume 102 may be a logical storage space within a data storage system in which data objects may be stored. The volume 102 may be identified by a volume identifier. Data for the volume 102 may reside in one physical storage device (e.g., a hard disk) or may comprise multiple partitions distributed across multiple storage devices. As an example the volume 102 may be a volume of block-level storage residing on one or more block-level storage devices of a block level storage service provided by a computing resource service provider. The block-level storage devices may, for instance, be operationally attached to virtual computer systems provided by a virtual computer system service of the computing resource service provider to serve as logical storage units (e.g., virtual drives) for the computer systems. A block-level storage device may enable the persistent storage of data used/generated by a corresponding virtual computer system, whereas the virtual computer system service may only provide ephemeral data storage. The snapshot updates 104 may be one or more snapshot updates of the volume 102.

As shown, the embodiment 100 has a snapshot depth of six, and thus each of the snapshot updates 104A-04B can be seen to comprise at least $1/6^{th}$ of the volume 102. For example, the snapshot update at time $t_1$, may include the first sixth of the volume 102. Likewise, the snapshot update at time $t_2$, may include the second sixth of the volume 102. The snapshot update at time $t_2$ may also include any changes to the first, third, fourth, fifth, or sixth portions of the volume 102 that have occurred since time $t_1$. Similarly, the snapshot update at time $t_3$, may include the third sixth of the volume 102, as well as any changes to the first, second, fourth, fifth, or sixth portions of the volume 102 that have occurred since time $t_2$. This process may continue up to the snapshot update at time $t_6$, which may include the final sixth of the volume 102, as well as any changes to the first, second, third, fourth, and fifth portions of the volume 102 that have occurred since time $t_5$. Note that at this point in time, the combination of each of the snapshot updates $t_1$ through $t_6$ covers all of the entire volume 102. Note as well, that at this point in time the sliding window 106 would comprise the snapshots of time $t_1$ through $t_6$.

Note also that, the snapshot update captured at time $t_7$ once again captures the first sixth of the volume 102. This snapshot update captured at time $t_7$ may also include any changes to the second, third, fourth, fifth, and sixth portions of the volume 102 that have occurred since time $t_6$. Because the snapshot update captured at time $t_7$ may include at least the first portion of the volume 102, the snapshot update captured at time $t_1$ may be redundant or obsolete. In some implementations, the snapshot update captured at time $t_1$ can subsequently be deleted to conserve space. Note that, in some of these implementations, these historical snapshot updates 104A (i.e., snapshot updates outside the sliding window 106) are retained until a customer owner of the volume 102 orders their deletion, whereas in other implementations, these historical snapshot updates 104A are deleted automatically once they are outside the sliding window 106. In still other implementations, a certain number of most recent historical snapshot updates may be retained, or each historical snapshot updates may be retained for a certain period of time (e.g., five days) before being deleted, or may be retained until the cumulative size of the historical snapshot updates 104 exceeds a certain threshold upon which time select historical snapshot updates may be deleted (e.g., oldest first) to keep the space requirements for the historical snapshot updates below the threshold. Thus, at time $t_7$ the sliding window 106 would cover the snapshots of time $t_2$ through $t_7$.

The sliding window 106 is simply intended to illustrate the active snapshot updates that comprise the full volume. The sliding window 106 would normally comprise the most recent snapshot updates up to the maximum snapshot depth, which in the embodiment 100 would be six, or up to the last full snapshot, whichever occurs first. For example, at time $t_0$ (not depicted), a full snapshot (i.e., a capture of all data of the volume; also referred to as a base snapshot) may have been taken of the volume. In this example at time $t_1$, the sliding window may include the snapshot update captured at time $t_1$ plus the full snapshot. Similarly, the sliding window at time $t_5$ may include the snapshot updates at time $t_1$ through time $t_5$ plus the full snapshot. However, when the snapshot update is captured at time $t_6$ all of the data of the volume 102, in its most up-to-date version, should be included in the accumulated snapshot updates captured from time $t_1$ through $t_6$, rendering the full snapshot at time $t_0$ redundant or obsolete.

Thus, in the embodiment 100 the most recent snapshot update was captured at time $t_{16}$, and, as illustrated, the sliding window 106 now includes the snapshot updates captured from time $t_{11}$ through $t_{16}$. This sliding window 106 also means that the snapshot updates captured from time $t_1$ through time $t_{10}$ (including, any full snapshots captured at that time such as at time $t_0$) should be redundant or obsolete, and in some implementations are deleted.

Note additionally that a full snapshot can be constructed from the active snapshot updates 104B. For example, at a time $t_{17}$ (not shown) a full snapshot may be assembled by first obtaining the oldest snapshot update of the active snapshot updates 104B (the snapshot update captured at time $t_{11}$), then combining that snapshot with the next oldest snapshot update of the active snapshot updates 104B (the snapshot update captured at time $t_{12}$), then combining with the next oldest snapshot update of the active snapshot update 104B (the snapshot update captured at time $t_{13}$), and so on until finally combining the most recent snapshot update of the active snapshot updates 104B (the snapshot update captured at time $t_{16}$). The volume 102 may be restored to the state it was in at a time of its most recent snapshot update in a similar manner.

Note that there are various implementations that may be used to generate a full snapshot or perform a full restore of a volume from its active snapshot updates than the one described above. In the manner described above, by starting with the oldest of the active snapshot updates data in an older snapshot that changed and the change captured in a more recent snapshot, may be naturally overwritten by the updated data. However, another technique may be to start with the most recent snapshot update (e.g., the snapshot update captured at time $t_{16}$) and work backwards to the oldest of the active snapshot updates, but skipping over any data in an older snapshot update that has already been included in a more recent snapshot update. Still another technique may be to generate a manifest that includes a reference to every data object of the volume 102 and the location where the most recent version of the data object can be found in the active snapshot updates 104B, and then generate a full snapshot (which may also be referred to as a full re-base snapshot) by a selectively obtaining only the most recent versions of the data objects from the particular snapshot update(s) hosting them. A full restore of the volume 102 may be performed in a similar manner. Note as well, that a partial restore of a volume 102 may be performed by locating the data objects to be restored within the manifest, and selectively obtaining the most recent versions of data objects from their respective active snapshot updates 104B.

In some implementations each of the snapshot updates 104A-04B have an associated set of permissions that grants access (e.g., read access, write access, etc.) to that particular snapshot update, such that a user or other entity having a first set of permissions granting access to first snapshot update is unable to access a second snapshot update unless the user or other entity also has a second set of permissions granting access to the second snapshot update. In some embodiments, one or more of the snapshot updates 104A-04B share a set of permissions that grant access to the one or more of the snapshot updates 104A-04B. In this manner, network security may be improved because users and other entities can be assigned permissions only to the actual snapshot they need to access.

Figure 2:
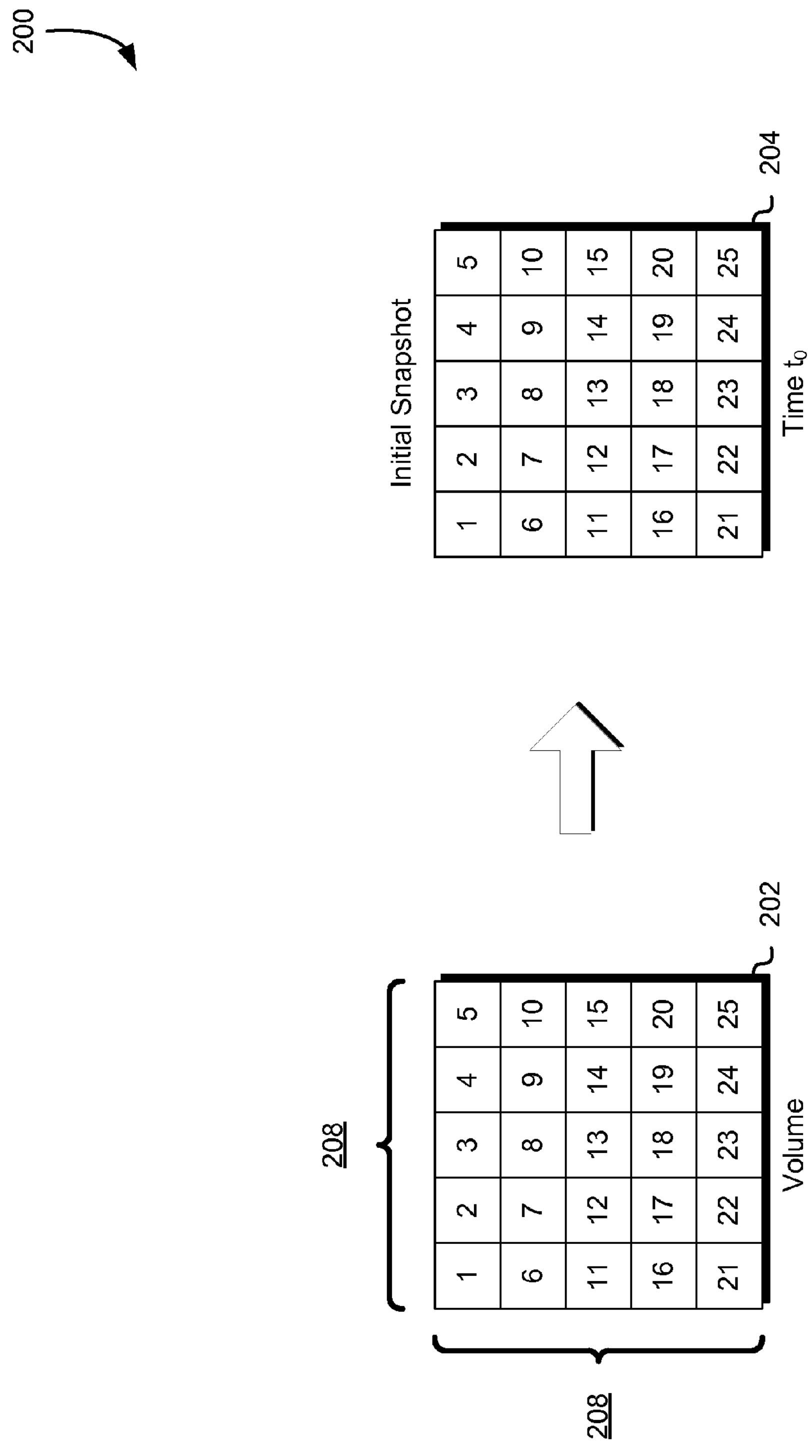
FIG. 2 illustrates an example of a volume and an initial snapshot in accordance with an embodiment.

FIG. 2 depicts a representation 200 of a volume 202 and an initial snapshot 204 of an embodiment of the present disclosure. The volume 202 depicted in FIG. 2 is comprised of 25 chunks 208 of data, from chunk 1 at position AA to chunk 25 at position EE. Each of the chunks 208 may include one or more data objects, such as blocks of data if the volume is a block level store. The volume 202 may be a volume similar to the volume 102 described in conjunction with FIG. 1. FIG. 2 also illustrates an initial snapshot 204 at a time $t_0$. The initial snapshot 204 may be at first snapshot of the volume 202, may be a re-based snapshot (as described above in conjunction with FIG. 1), or any other full snapshot of the volume 202. That is, each of the chunks 208 are included in the initial snapshot 204 in a same version as they were in the volume 202 at the time represented by time $t_0$. FIG. 2 represents an initial state of the volume 202 and the volume 302 of FIG. 3 prior to capturing any of the snapshot updates depicted in FIG. 3.

Figure 3:
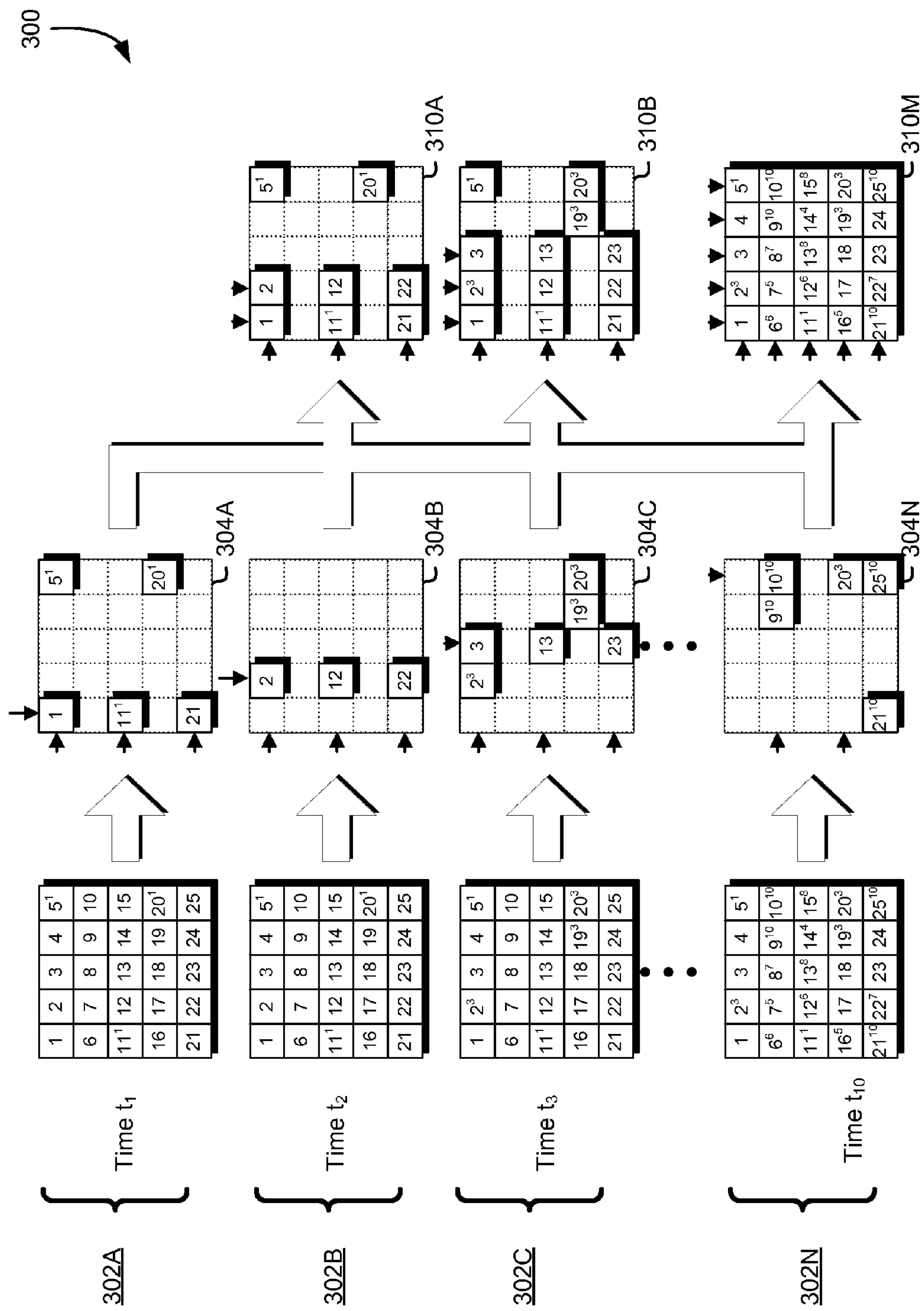
FIG. 3 illustrates an example of a volume and snapshot updates in accordance with an embodiment.

Similar to FIG. 2, FIG. 3 depicts representations 300 of a volume as data on the volume changes and as snapshot updates 304A-04N are taken over time. For example, volume 302A represents the volume at time $t_1$, volume 302B represents the volume at time $t_2$, volume 302C represents the volume at time $t_3$, and volume 302N represents the volume at time $t_{10}$. The volume may be a volume similar to the volumes 102 and 202 of FIGS. 1 and 2 respectively. The representations 300 depicted an embodiment of the present disclosure with a maximum snapshot depth of 10; in other words, a full snapshot or a full restore of the volume may be generated using no more than 10 consecutive snapshot updates of the present disclosure.

A manifest may be generated listing one or more data objects included in the volume such as blocks of data, chunks of one or more blocks of data, files, or other data objects depending on the implementation. Starting at time $t_1$, it is seen that chunks 5, 11, and 20 have changed since an initial state (e.g., a state of the volume at time $t_0$ as depicted in FIG. 2). As part of the first snapshot update, these changed chunks may naturally be included in the incremental portion of the first snapshot update 304A. Additionally, at time $t_1$ a proportion of the entire volume may also be included in the first snapshot update 304A, the proportion being based on the maximum snapshot depth, which in the case of the representations 300 would be 1/10 or 10%. This may be achieved, for example by incrementing a snapshot counter, taking the modulus of the snapshot depth (being 10, in that example) of an identifier or order number in the manifest for each chunk in the manifest, and including the chunks whose modulus 10 matches the modulus 10 of the snapshot counter. In other words, at time $t_1$ the snapshot counter may be 1, and 1 mod 10 is 1. Assuming the numbers of the chunks in the volume 302A correspond to identifiers for the particular chunks, the modulus of the identifier for chunk 1 of the volume 302A, 1 mod 10 is 1, which matches the modulus of the snapshot counter, and therefore chunk 1 would be included in the proportional portion of the first snapshot update. However, the modulus for chunk 2 of volume 302A, 2 mod 10 is 2, which does not match the modulus 10 of the snapshot counter, therefore chunk 2 would be excluded from the proportional portion of the first snapshot update, and so on. Skipping down, however, the modulus for chunk 11 a volume 302A, 11 mod 10 is 1, which again matches the modulus 10 of the snapshot counter so chunk 11 would normally be included in the proportional portion of the first snapshot update. Chunk 21 is included for the same reason. The black arrows in the snapshot updates 304A-04N are intended to highlight the chunks corresponding to the proportional portion. Note though, that chunk 11 has also been modified since the initial state, as indicated by the superscript of the snapshot counter ($^1$). Thus, chunk 11 would have been already included in the incremental portion of the first snapshot update.

Although examples in the present disclosure describe determining which chunks (or data objects) to include in the proportional portion based on a modulus of some value associated with the chunk (or data object), such as an identifier or counter, other methods are contemplated as well. For example, at a first time, a first 1/Nth of chunks in the volume may be included in the proportional portion, where N is the snapshot depth, and at a second time the next 1/Nth of chunks (or data objects) in the volume may be included in the proportional portion, and so on. This may continue until, after including the last 1/Nth, the next snapshot update includes the first 1/Nth of chunks (or data objects) again, and so on. An alternative may be to base the snapshot depth on time. For example, the proportional portion may include as many chunks (or data objects) as can be copied to the snapshot location within a certain period of time (e.g., 1 minute, 5 minutes, 16 minutes, etc.). The certain amount of time may be based on the frequency that snapshot updates are being performed. For example, if snapshot updates are performed (e.g., by instruction from a customer owner) on the volume every 15 seconds, the proportional portion may include only as many chunks as can be copied within 5 seconds, in order to provide enough time to copy the incremental portion before the next snapshot update is performed.

In some implementations, the version of chunk 11 included in the proportional portion of the first snapshot update would be the previous version (i.e., from the initial snapshot at $t_0$); that is, the first snapshot update would include both the previous version of chunk 11 and the current version of chunk 11. In some implementations, the incremental portion of the snapshot update is determined before the proportional portion. In other implementations, the proportional portion of the snapshot update is determined before the incremental portion. In either implementation, a duplicate of a chunk that has already been included in a portion of the snapshot update may be excluded to avoid duplication. That is, in these implementations the set of data objects in the incremental portion and the set of data objects in the proportional portion may be disjoint from each other (i.e., they do not share the same data objects). However, in other implementations, such as where each portion of the snapshot update are generated and stored separately but in association with each other, duplicate chunks may be retained. In other words, in these other implementations, the set of data objects in the incremental portion, and the set of data objects in the proportional portion may intersect at times. Thus, as depicted in the representations 300, chunks 1, 5, 11, 20, and 21 may be included in the incremental and proportional portions of the first snapshot update 304A.

Moving on to the volume 302B at time $t_2$, it can be seen that no updates have occurred to any chunks between time $t_1$ and time $t_2$. Thus, the second snapshot update 304B only includes a proportional portion (indicated by the black arrows). That is, the snapshot counter has been incremented to two, meaning that the modulus 10 of chunks 2, 12, and 22 matches the modulus 10 of the snapshot counter, and thus chunks 2, 12, and 22 will be included in the second snapshot update at time $t_2$. Snapshot window 310A is intended to illustrate the chunks collectively stored in the first snapshot update and the second snapshot update.

Proceeding to time $t_3$, it can be seen that chunk 2 has changed between time $t_2$ and time $t_3$, as indicated by the superscript of the snapshot counter ($^3$), as well as chunks 19 and 20. Thus, chunks 2, 19, and 20 will be included in the incremental portion of the third snapshot update, and chunks 3, 13, and 23 will be included in the proportional portion (indicated by the black arrows) of the third snapshot update because the modulus 10 of the identifiers of these chunks match the modulus 10 of the snapshot counter. Note that chunks 2 and 20 have already been included in prior snapshot updates (i.e., the second snapshot update and the first snapshot update respectively). Because chunks 2 and 20 in the third snapshot update reflect the most recent change to those respective chunks, during a re-base or during a restore of a volume from the snapshot the older versions of these respective chunks (i.e., from the second snapshot update and the first snapshot update) may be omitted from the restore, or, alternatively, may be overwritten by the more recent version of those respective chunks in the third snapshot update. In still other implementations, the older versions of respective chunks are deleted from their respective snapshot updates (i.e., the second snapshot update and the first snapshot update). In even other implementations, the versions of chunks 2 and 20 included in the proportional portion of the first snapshot update would be the previous versions (i.e., chunk 2 from the initial snapshot at $t_0$ and chunk 20 from the first snapshot update at $t_1$); that is, the third snapshot update would include both the previous version of chunks 2 and 20 and the current versions of chunks 2 and 20. Snapshot window 310B consequently illustrates how, with each succeeding snapshot update, the snapshot updates collectively store more of the state of the volume 302C.

The process may continue for each snapshot update as described above such that, at time $t_{10}$, it can be seen that, for the volume 302N, chunk 5 was last modified prior to time $t_1$, chunks 2 and 20 were last modified between time $t_2$ and $t_3$, chunk 14 was last modified between time $t_3$ and $t_4$, chunks 7 and 16 were last modified between time $t_4$ and $t_5$, chunks 6 and 12 were last modified between time $t_5$ and $t_6$, chunks 8 and 22 were last modified between time $t_6$ and $t_7$, chunks 13 and 15 were last modified between time $t_7$ and $t_8$, and chunks 9, 10, 21, and 25 were last modified between time $t_9$ and $t_{10}$. It can also be seen that chunks 1, 3, 4, 17, 18, 23, and 24 have not changed at all since the initial snapshot. Thus, at this time it is seen that chunks 9, 10, 21 and 25 would be included in the incremental portion of the tenth snapshot update 304N, and chunks 10 and 20 would be included in the proportional portion of the tenth snapshot update 304N (with duplicate chunk 10 discarded or not discarded from one of the portions, or previous version of chunk 10 included in the proportional portion, depending on the implementation).

Note that chunk 20, which would be included in the proportional portion of the $10^{th}$ snapshot update 304N has not changed since time $t_3$, and thus was already included in the third snapshot update, which is still within the current snapshot window. Consequently, in some implementations, chunk 20 can be excluded from the $10^{th}$ snapshot update because, during a full re-base or restore of the volume 302N, the most recent version of chunk 20 can still be obtained from a previous snapshot (i.e., the third snapshot update) within the current snapshot window. Furthermore, it can be seen now that, because the snapshot window 310M now includes as many snapshot updates as the maximum snapshot depth of 10, the totality of all of the active snapshot updates 304A-04N in the snapshot window include all of the chunks required for a full re-base or a full restore of the state of the volume 302N at time $t_{10}$.

In some implementations, snapshot updates can be performed on-demand, such as in response to a request from a customer or other entity authorized to request a snapshot of the volume. In other additional or alternative implementations, snapshot updates occur in response to a particular event. For example, a snapshot update may be triggered to occur after every 1,000 writes to the volume being snapshotted. As another example, a snapshot update may be triggered to occur when a computing device hosting the volume detects that an operating temperature has exceeded a threshold temperature. In another additional or alternative implementation, a snapshot update that is scheduled or instructed to be performed can be postponed upon the occurrence of a particular event and resumed upon the occurrence of another event. For example, if a computing device hosting the volume detects that an operating temperature has exceeded a threshold temperature, a schedule snapshot update may be postponed until the operating temperature is detected to have dropped below the threshold temperature.

Figure 4:
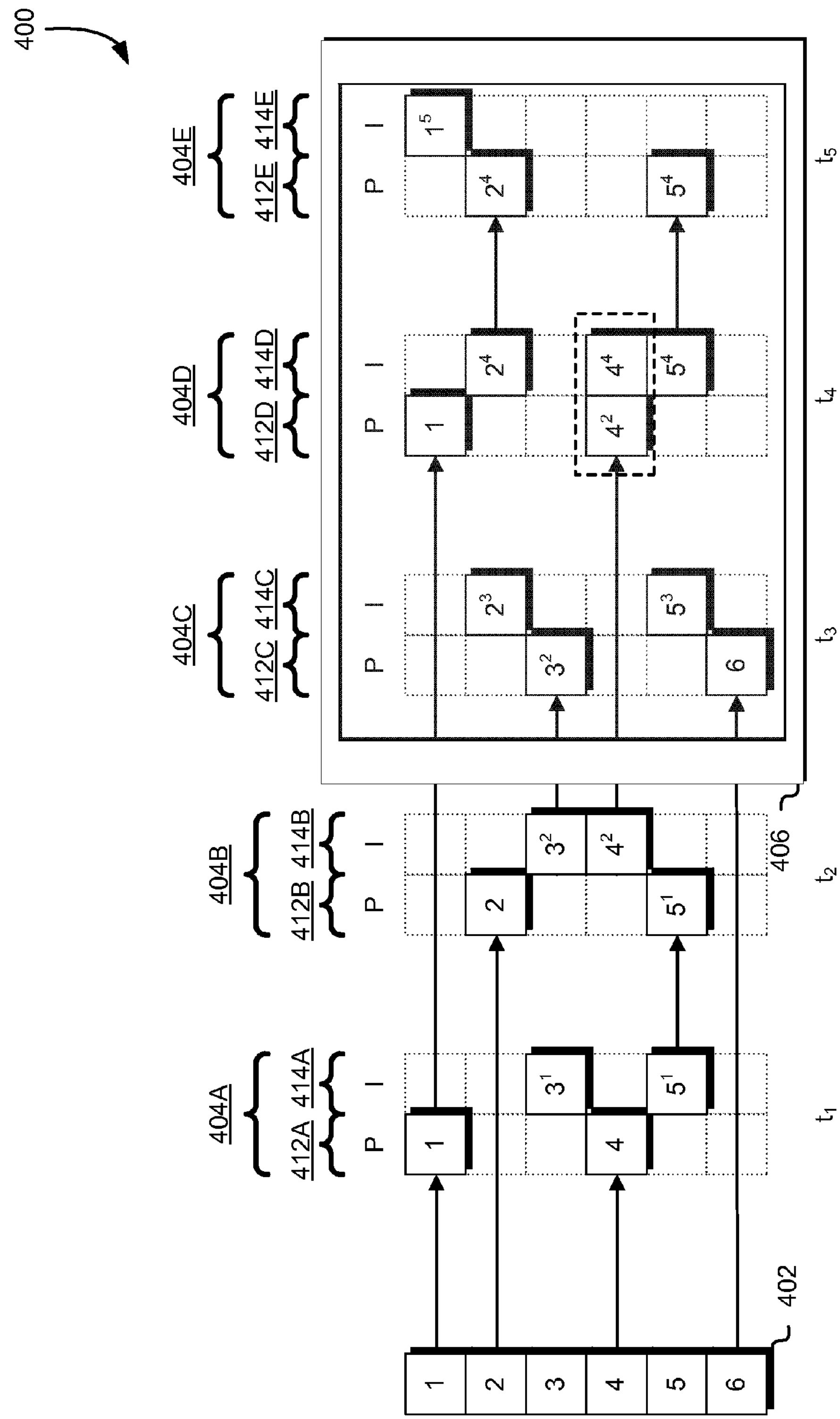
FIG. 4 illustrates an example of snapshot updating and a sliding window in accordance with an embodiment.

FIG. 4 illustrates a representation 400 of an embodiment of the present disclosure. Specifically, FIG. 4 depicts making snapshot updates in accordance with an embodiment of the present disclosure of a volume 402 divided into six data objects, where each data object may be a chunk comprising one or more blocks of a block-level storage device. The representation 400 depicts the volume 402 and five snapshot updates 404A-04E, where each snapshot update includes a proportional portion 412A-12E and an incremental portion 414A-14E. The maximum snapshot depth of the embodiment depicted in FIG. 4 is three, represented by the snapshot window 406 showing the three most recent snapshot updates 404C-04E as the active snapshots.

At time $t_1$, a first full manifest may be created. The manifest indicates locations where data objects may be found, such that the manifest can act as a map to the versions of data objects at time $t_1$. At time $t_1$, since no previous snapshot updates exist, the locations of the data objects will likely all be from the volume 402 or an initial snapshot at time $t_0$ (not shown). As can be seen, at time $t_1$ (snapshot count=1), data objects 1 and 4 are included in the first proportional portion 412A (modulus 3 of the snapshot count equals modulus 3 of 1 and 4), and data objects 3 and 5 have been modified since the initial snapshot at time $t_0$ and are therefore included in the first incremental portion 414A of the first snapshot update 404A. A first partial manifest (also referred to as a "change set") may be generated for the first snapshot update 404A to reflect the data objects that are included in the first snapshot update 404A; alternatively the first full manifest may be updated to reflect these locations. These manifests may be stored in association with the first snapshot update 404A (e.g., in a same directory or in a database record having information indicating the storage location of the first snapshot update 404A).

At time $t_2$, a second full manifest may be created. The second full manifest may indicate that the most recent version of data objects 1 and 5 are located in the first snapshot update 404A, with the rest being located on the volume 402 or in the initial snapshot at time $t_0$. Thus, at time $t_2$ (snapshot count=2), data objects 2 and 5 are included in the second proportional portion 412B (modulus 3 of the snapshot count equals modulus 3 of 2 and 5). With a snapshot depth of three, the first and second snapshot updates 404A-04B are within the sliding window 406 at this time, and it can be seen that data object 5 is included in both snapshots. In some embodiments, data object 5 is removed from the first snapshot update 404A to conserve space, in other embodiments data object 5 is omitted from the second snapshot update 404B to conserve space (however, care must be taken to ensure that data object 5 is carried forward as the sliding window 406 passes the first snapshot update 404A), and in still other embodiments data object 5 is retained in both the first and second snapshot updates 404A-04B. It can be seen that data objects 3 and 4 have changed since time $t_1$, and therefore will be included in the second incremental portion 414B of the second snapshot update 404B. A second partial manifest may be generated for the second snapshot update 404B to reflect the data objects that are included in the second snapshot update 404B; alternatively, the second full manifest may be updated to reflect these locations. These manifests may be stored in association with the second snapshot update 404B.

At time $t_3$, a third full manifest may be created indicating that the most recent version of data object 1 is still in the first snapshot update 404A, most recent versions of data objects 3 and 4 are in the second snapshot update 404B, and the most recent version of data object 6 is still on the volume 402 or in the initial snapshot at time $t_0$. At time $t_3$ (snapshot count=3), data objects 3 and 6 are included in the third proportional portion 412C. Note that, depending on the particular implementation, the data object 3 may be obtained from the second snapshot update 404B, the volume 402, or omitted from the third proportional portion 412C since it is currently included in the second snapshot update 404B which is still inside the sliding window 406. It can be seen that data objects 2 and 5 have changed since time $t_2$, and therefore will be included in the third incremental portion 414C of the third snapshot update 404C. Note that, at this point, due to the maximum snapshot depth being three, the sliding window 406 now no longer includes the initial snapshot at time $t_0$. In some implementations, the full initial snapshot at time $t_0$ can be deleted, as the most current versions of the data objects should be found within the sliding window 406. A third partial manifest may be generated or the third full manifest may be updated in a similar manner as described above.

In a similar manner, at time $t_4$ the fourth proportional portion 412D of the fourth snapshot update 404D will include data objects 1 and 4. Note that because the initial snapshot at time $t_0$ is no longer included in the snapshot window 406, data object 1 may be retrieved from the first snapshot update 404A. In alternate embodiments, rather than retrieving data object 1 from snapshot update 404A, data object 1 is obtained directly from the volume. In these embodiments, obtaining the proportional portion directly from the volume may be preferable in order to reduce error propagation. For example, if data corruption occurred during a copy operation from an earlier snapshot, that data corruption might be inadvertently copied into future snapshot updates. However, by obtaining the proportional portion directly from the volume, the snapshot update will at least have the proportional portion in the state it is on the volume. Note however, obtaining the proportional portion directly from the volume may be more taxing on the resources of the computing system hosting the volume. In some implementations, the proportional portion can alternate obtaining the proportional portion from a previous snapshot and obtaining the proportional portion from the volume (i.e., redundant copy) according to a schedule or according to resource demand. For example, a daily proportional portion may be obtained from a previous snapshot Sunday through Friday, but every Saturday it is obtained directly from the volume (in this manner data may be periodically refreshed). On the other hand, in another example, proportional portion may be obtained from directly from the volume unless resource usage/demand for the volume exceeds a threshold, whereupon the proportional portion may be obtained from a previous snapshot instead. Note that in embodiments of the present disclosure, data objects are obtained from the volume by a customer owner of the volume causing the data objects to be pushed to the system storing the snapshots, such as through an application executing in a virtual machine instance attached to the volume or otherwise by an instruction through an application programming interface. Alternatively, in some implementations, the system performing the snapshotting process of the present disclosure accesses the volume on its own and copies the data objects directly from the volume.

As for the fourth incremental portion 414D, it is seen that data objects 2, 4, and 5 have changed since time $t_3$, and therefore the versions of those data objects will be retrieved from the actual volume 402. Note however, that in this embodiment, the fourth proportional portion 412D includes the previous version of data object 4 while the fourth incremental portion 414D includes the current version of data object 4. This is important for performing a rollback in a manner described below. However it should be noted that not all embodiments of the present disclosure retain both versions in the fourth snapshot update 404D. At this point, the sliding window 406 includes the second, third, and fourth snapshot updates 404B-04D. A fourth partial manifest may be generated or the fourth full manifest may be updated in a similar manner as described above.

The techniques for the fifth snapshot update 404E follows a similar pattern. At $t_5$ (snapshot count=5), the fifth proportional portion 412E includes data objects 2 and 5, and it can be seen that data object 1 has changed since time $t_4$ and therefore will be included in the fifth incremental portion 414E. At this time the sliding window 406 will be at the location depicted in FIG. 4, and the active snapshot updates are the third, fourth, and fifth snapshot updates 404C-04E. A fifth partial manifest may be generated or the fifth full manifest may be updated in a similar manner as described above.

In the embodiment depicted in FIG. 4, it may be possible to rollback to any previous point in the sliding window 406. For example, in a case where it is desirable to restore the volume to the state it was in at time $t_3$, a manifest may first be generated to determine the locations of the data objects in the state they would have been at time $t_3$. In some embodiments, this is performed by first examining the manifest that was generated at time $t_3$ for the locations of the data objects. For example, the manifest for the third snapshot update 404C would indicate that the second, third, fifth, and sixth data objects can be found at locations in the third snapshot update 404C, that first data object may be found in the first snapshot update 404A, and that the fourth data object may be found in the second snapshot update 404B. However, since the first and second snapshot update 404A-04B are no longer in the sliding window 406, they may be unavailable. Therefore, the system performing the rollback process may look at the manifests of succeeding snapshot updates 404D-04E to locate data objects 1 and 4. As can be seen, the data object 1 and 4 are found in the fourth snapshot update 404D. However, data object 4, as noted, changed between times $t_3$ and $t_4$. Because restoring data object 4 from the fourth incremental portion 414D would result in a version of data object 4 that was not present in the volume at time $t_3$, the data object 4 from the fourth proportional portion 412D, which reflects the version of data object 4 as it was at time $t_3$. In this manner, a rollback of the volume 402 may be performed for any time within the sliding window 406. Note that in some embodiments, the proportional portion of data object 4 would not be carried forward to the snapshot update 404D; in such embodiments, data object 4 may be obtained from a previous snapshot update (e.g., snapshot update 404B) outside the sliding window 406. In such embodiments, historical snapshot updates 404A-04B might not be automatically deleted or may be retained at least temporarily in order to provide the ability to roll back to a previous state.

Figure 5:
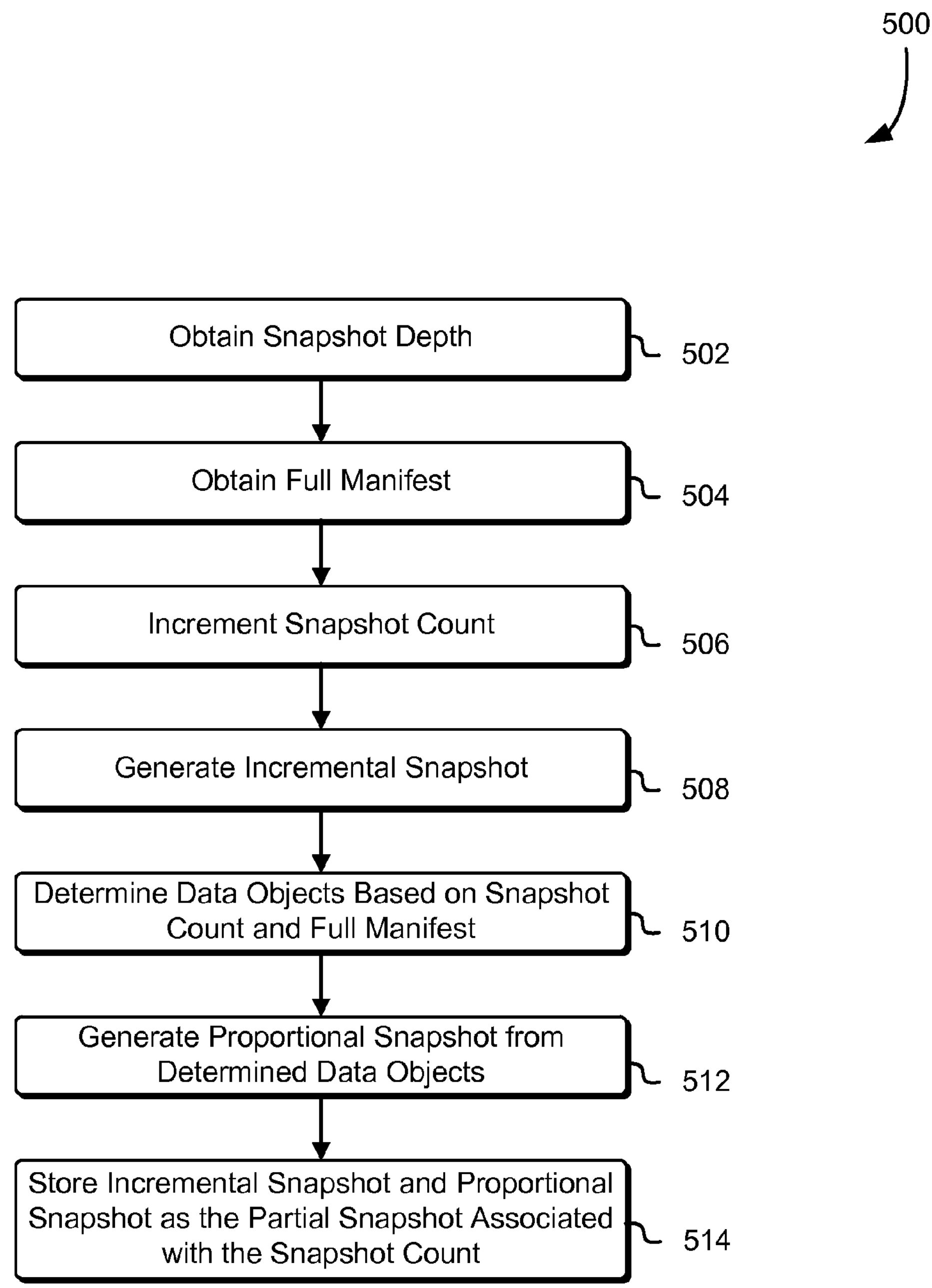
FIG. 5 is a block diagram that illustrates an example of performing a snapshot update in accordance with an embodiment.

FIG. 5 is a block diagram illustrating an example of a process 500 for performing a snapshot update in accordance with various embodiments. The process 500 may be performed by any suitable system such as a server in a data center, such as the web server 806 or the application server 808 of FIG. 8, multiple computing devices in a distributed system of a computing resource service provider, or any electronic client device such as the electronic client device 802 described in conjunction with FIG. 8. The process 500 includes a series of operations wherein a snapshot is obtained, a volume manifest generated, a snapshot count is incremented, and snapshot updates of the volume are determined, obtained, and stored.

In 502, a maximum snapshot depth for a volume is obtained. For example, a service provider may determine that no more than 100 snapshot updates should be active (i.e., within the current snapshot window), and consequently set the maximum snapshot depth to 100. In some implementations, the determination of the maximum snapshot depth is made on a volume-by-volume basis. For example small volumes may be configured to have a larger snapshot depth (e.g., 1,000 snapshot updates), whereas large volumes may have smaller snapshot depths (e.g., 100), because more storage resources may be required for storing the snapshot updates of the larger volumes than the smaller volumes. Similarly, performance concerns may dictate the maximum snapshot depth. For example, for a given volume size, the shallower the snapshot depth, the longer it will take to generate the snapshot update. Taking a 16 gigabyte (GB) volume as an example, a snapshot depth of 160 means that each snapshot update will be at least 100 megabytes (MB) in size, whereas a snapshot depth of 16 means that each snapshot update will be at least 1 GB in size, and consequently consume more time and resources while being generated than the smaller snapshot. In some implementations, the maximum snapshot depth can be specified by a customer of a computing resource service provider, where the computing resource service provider provides the volume to the customer. For example, the computing resource service provider may provide an application programming interface to the customer through which the customer can specify the customer desired maximum snapshot depth for the particular customer volume.

In 504, the system performing the process 500 may obtain a manifest that contains locations of data objects, such as blocks or groups (also referred to as “chunks”) of blocks of storage of a block level store. The locations of the data objects indicated in the manifest may be locations in one or more full or snapshot updates, or may be locations of the data objects in the actual volume. For example, in a scenario where a full snapshot exists for a volume as well as five snapshot updates of the present disclosure, the manifest might indicate that a most recent version of first chunk is located at a particular location in the full snapshot, a most recent version of second chunk is located in a particular location in a third snapshot update, a most recent version of the third chunk is located in a particular location in a first snapshot update, and so on. The manifest may also indicate the locations of the chunk in the actual volume so that it can be determined whether the chunk in the actual volume is more up-to-date than (i.e., has been updated since) the most recent version of the corresponding chunk in a partial or full snapshot.

In 506, a snapshot count is incremented. In embodiments, the system performing the process 500 keep track of the number of snapshot updates made of a particular volume by use of the snapshot count. The snapshot count is incremented in 506 to reflect the upcoming snapshot update generated in 508-14. In 508, an incremental snapshot is generated. The incremental snapshot includes data objects that have been modified since the preceding snapshot update was made. For example, if one or more block of a chunk was modified before time $t_1$ and the chunk was included in a snapshot update taken at time $t_1$, if, at time $t_2$, none of the blocks of the chunk had been modified since time $t_1$, the chunk would not be included in the incremental snapshot taken at time $t_2$. On the other hand, if one or more blocks of the chunk had been modified between time $t_1$ and time $t_2$, the chunk would be included in the incremental snapshot taken at time $t_2$. Similarly, any chunk whose blocks remain unmodified from an initial snapshot or from the volume at an initial state would not be included in the incremental snapshot.

Note that in some implementations, the operations of 608, rather than generating an actual snapshot, generate a list of data objects that have been modified since the preceding snapshot and their locations in the volume to be included in the snapshot update. That is, in some embodiments the operations of 508-10 result in a set of objects to be included in a snapshot update, and the operations of 512 may generate the snapshot update based at least in part on that set of objects.

In 510, the system performing the process 500 may determine a set of objects to include in a proportional portion of the snapshot update. The set of data objects may comprise at least 1/Nth of the data objects of the volume, where N is the maximum snapshot depth. The selection of which 1/Nth of the data objects to include in the set of data objects may be made in a variety of ways. For example, where N is 10, the first proportional portion (i.e., the proportional portion determined by the system performing the process 500 at a time $t_1$) may be the first 10% of data objects in the volume, the second proportional portion (i.e., the proportional portion determined by the system performing the process 500 at a time $t_2$) may be the second 10% of data objects in the volume, and so on. Alternatively, where N is 10, the volume may be divided into numbered chunks of blocks, and if the modulus 10 of the chunk number matches the modulus 10 of the incremented snapshot count, that corresponding chunk may be included in the set of data objects for a proportional portion of the snapshot update. The latter method may result in the proportional portions being selected in an interlaced/interleaved fashion, while the former method may result in the proportional portions being selected in a progressive (i.e., non-interlaced) fashion. There may be advantages of one method over the other, depending on the particular implementation of the present disclosure, and other methods for selecting proportional portions are additionally contemplated.

In some embodiments, the maximum snapshot depth (i.e., the size of the sliding window) is dynamically adjusted. For example, the maximum snapshot depth may be increased during periods of scarce computing resources in order to accommodate smaller snapshot updates. Conversely, during periods of surplus computing resources (e.g., network demand falls below a minimum threshold/sentinel value, a number of idle storage devices exceed an upper threshold, processor idle time exceeds a threshold, etc.), the maximum snapshot depth may be decreased, allowing for larger snapshot updates. Note that, in some cases where the maximum snapshot depth is dynamically decreased, the deletion of some snapshot updates outside the sliding window may be delayed until all parts of the volume/rolling rebase have been carried forward into the sliding window.

Alternatively, if it is estimated/determined that the time required to perform the process 500 at a current maximum snapshot depth would exceed a maximum time threshold, the maximum snapshot depth may be increased to an amount sufficient to keep the time required to perform the process 500 below the threshold. Determinations of whether computing resources are scarce or in surplus may be made by a monitoring application or service that may be configured to adjust the maximum snapshot depth to a determined appropriate depth dynamically. For example, if computing resources are determined to be sufficient (e.g., little or no performance impact to customers of the computing resource service provider) to perform a full snapshot, the maximum snapshot depth may be changed to 1 for as long as available computing resources are determined to be sufficient, thereby causing full snapshots to be performed periodically or otherwise according to the snapshot update schedule.

As another example, if a snapshot update is being performed with a maximum snapshot depth of 10 and it is determined in 510-12 by the system performing the process 500 that computing resources currently allocated to performing the process 500 need to be released and made available to some other process, the maximum snapshot depth may be dynamically increased in order for the process 500 to complete more quickly. For example, if, in the previous example, the system performing the process had up to this point only determined and obtained 1% of the proportional portion of the snapshot update, the maximum snapshot depth may be increased to 100, and the process 500 may consequently be concluded. In this manner, in such embodiments, the number of data objects in the set of data objects and/or sizes of the proportional snapshots can vary from snapshot to snapshot.

In another embodiment, the maximum snapshot depth is adjusted on demand by a customer owner of the volume or some other authorized entity. For example, a computing resource service provider may have a billing plan whereby customers are charged based on the number of snapshots performed. In such an example, a customer may choose to reduce the maximum snapshot depth in order to minimize his charges. As another example, a computing resource service provider may have a billing plan whereby customers are charged based on the size of snapshots that are performed. In such an example, a customer may choose to increase the maximum snapshot depth in order to reduce the size of the snapshot updates and thereby minimize his charges. The maximum snapshot depth may be adjusted in these examples using a web interface and/or an application programming interface provided by the computing resource service provider.

Also in 510, in some embodiments data objects in the set of data objects which are duplicative of data objects already selected for the incremental portion of 508, are excluded from the set of data objects. In this manner, the size of the snapshot update may be minimized by avoiding the inclusion of duplicate data objects. Note that in embodiments where the order of determining the data objects for the incremental portion and the data objects for the proportional portion is reversed, the duplicate data objects may be excluded from the incremental portion instead. Additionally, in some implementations where a most recent version of data object selected for the set of data objects for the proportional portion is found in a snapshot within N snapshots of the current snapshot (i.e., the snapshot window), that data object would also be excluded from the set of data objects. That is, where a goal of an embodiment of the present disclosure is to ensure that a full re-base or restore of the volume can be accomplished using only N snapshots, as long as that data object is within the snapshot window the goal can be accomplished and the size of the current snapshot update can be minimized by excluding the duplicate data object.

As noted, in some implementations, the snapshots of 508 and 512 can be combined into a single snapshot update, whereas in other implementations the snapshots of 508 and 512 result in separate snapshots that may be both stored in association with the snapshot count number and may be cumulatively considered to be the snapshot update.

Note that the process 500 may be performed periodically (e.g., every hour, every 10 minutes, every 15 seconds, etc.) or according to some other schedule (e.g., next Wednesday at 3 PM, every third Tuesday, the last full weekend in July, etc.). Additionally or alternatively, the process 500 may be performed in response to the occurrence of an event. For example, the process 500 may be triggered by the system detecting that computing resource usage, such as network demand, has fallen below a threshold value, making it a good time to perform the process 500. As another example, the system may detect that a number of changed data objects have exceeded the threshold, and therefore the process 500 should be performed to capture those changes. Similarly, as another example, the system may detect that a file or other data object that has been flagged with high importance has changed, and consequently the process 500 should be performed to capture that change. Additionally or alternatively, the process 500 may be performed on demand in response to a request by a customer owner of the volume or some other authorized entity to perform a snapshot. Note too that one or more of the operations performed in 502-14 may be performed in various orders and combinations, including in parallel. For example, in some embodiments, the operations of 510-12 are performed prior to or in parallel with the operations of 508.

Figure 6:
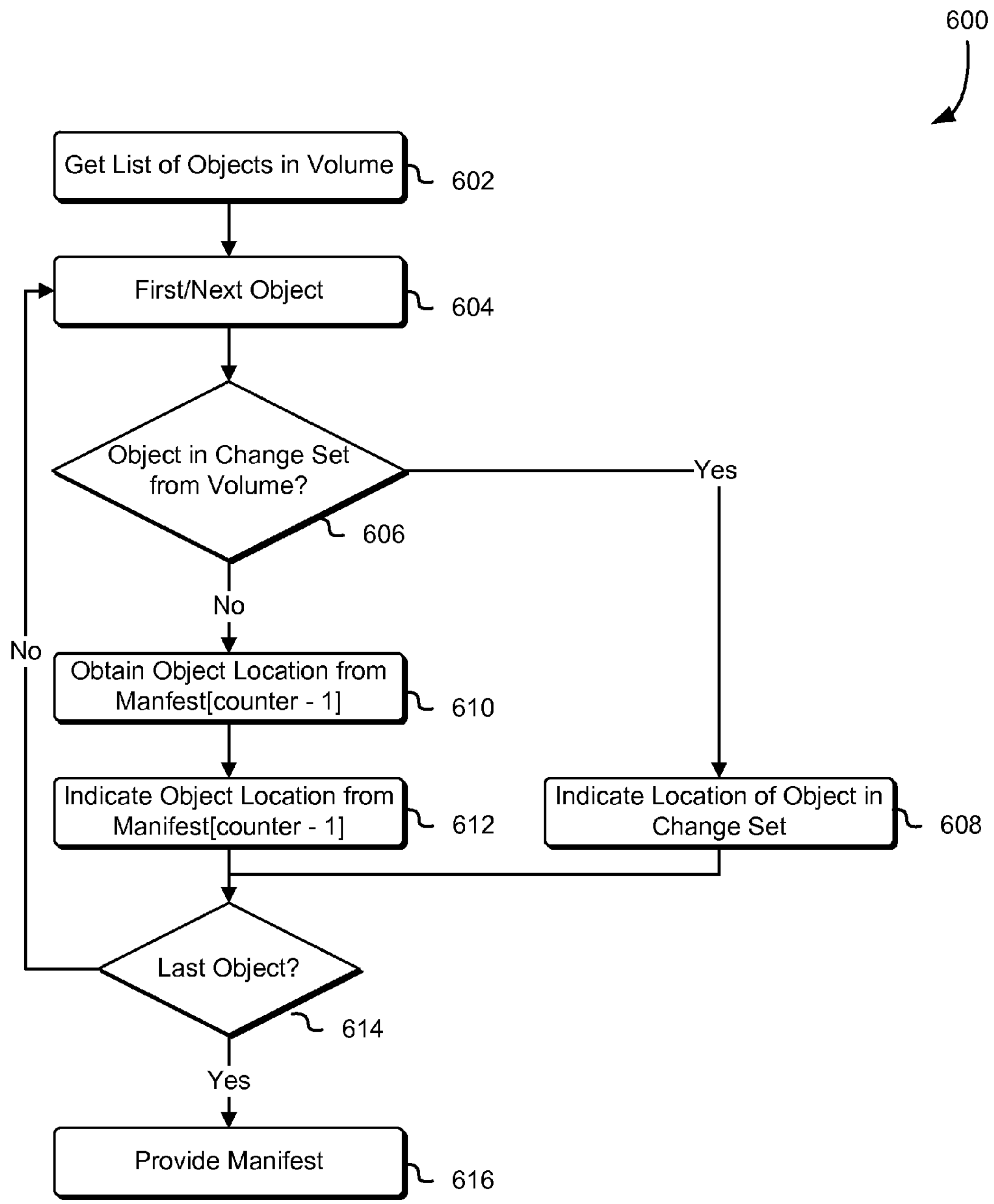
FIG. 6 is a flow chart that illustrates an example of generating a manifest in accordance with an embodiment.

FIG. 6 is a flow chart illustrating an example of a process 600 for generating a full manifest for a snapshot update in accordance with various embodiments. The process 600 may be performed by any suitable system such as a server in a data center, such as the web server 806 or the application server 808 of FIG. 8, multiple computing devices in a distributed system of a computing resource service provider, or any electronic client device such as the electronic client device 802 described in conjunction with FIG. 8. The process 600 may be performed by the system storing the snapshot update of the volume. The process 600 includes a series of operations wherein a list of data objects in a volume is obtained, and for each object, the location of that object in a previous snapshot update is determined, and based on a determination of whether the object in the previous snapshot update has been modified, a location is indicated in the manifest.

In 602, a list of data objects in the volume is determined. As noted, these data objects may be any of a variety of types of data objects, such as files, blocks in a block level store, chunks of blocks in a block level store, or portions or groups of any of the above. For example, a 1 GB volume may be comprised of 262,144 chunks as data objects, each of which may be comprised of 512 byte blocks of the volume. In such an example, the list of data objects may include a list of the 262,144 chunks, such as numbered from 1 to 262,144.

For each data object in the list, starting with the first data object in 604, the system performing the process 600 may determine the location of the respective data object. In 606, the system may determine whether the object is present within the incremental portion (i.e., change set) of data objects being pushed to the system from the client (e.g., the virtual machine or host computing system attached to the volume). If the object is present within the change set, the system performing the process 600 may proceed to 608, whereupon the system may indicate in the manifest being generated that the location of the data object is within the incremental portion of the current snapshot update.

Otherwise, if the system performing the process 600 determines that the current data object is not found within the incremental portion, in 610, the system may refer to the manifest of the previous snapshot or snapshot update to obtain the object location, and in 612 the system may indicate in the manifest being generated that the data object is located at the object location specified by the previous snapshot or snapshot update manifest.

In 614, the system performing the process 600 may determine whether the process 600 has reached the end of the list of data objects obtained in 602. If not, the system may return to 604 to begin the sub-process to determine the location for the next data object in the list of data objects. Otherwise, if each data object of the volume has been located, the manifest should be fully generated, and in 616, this manifest may be stored and/or provided as needed. In some embodiments, the full manifest generated at the time of each snapshot update is stored in association with that snapshot update. In other embodiments the full manifest is generated on-the-fly, and only partial manifest containing the list of data objects in that snapshot update that were changed since the previous snapshot (i.e., the incremental portion of the snapshot update) and/or the list of data objects in the proportional portion of the snapshot update. In these embodiments, the full manifest may be generated on-the-fly based at least in part on the previously generated partial manifests. Note that one or more of the operations performed in 602-16 may be performed in various orders and combinations, including in parallel.

In embodiments, the system of the present disclosure utilize random access (also known as direct access) media (e.g., hard disk drives, solid-state drives, optical media drives, etc.) for storing the snapshot updates and or manifests. By using random access media, the data objects in the proportional portion of the snapshot update may be retrieved directly, and therefore potentially more efficiently, from previous snapshots without having to sequentially seek through the media in order to locate the data objects.

Figure 7:
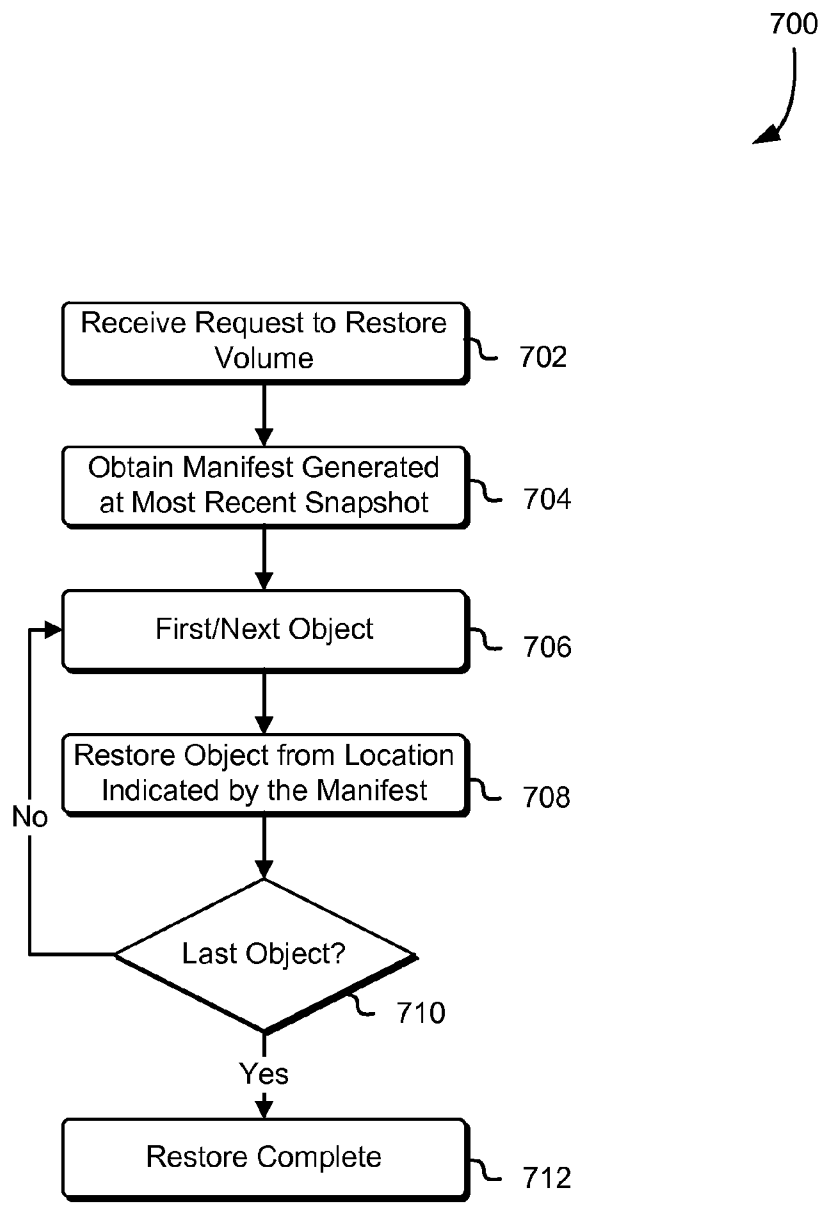
FIG. 7 is a flow chart that illustrates an example of restoring a volume in accordance with an embodiment.

FIG. 7 is a flow chart illustrating an example of a process 700 for restoring a volume from snapshots taken in accordance with various embodiments. The process 700 may be performed by any suitable system such as a server in a data center, such as the web server 806 or the application server 808 of FIG. 8, multiple computing devices in a distributed system of a computing resource service provider, or any electronic client device such as the electronic client device 802 described in conjunction with FIG. 8. The process 700 includes a series of operations wherein a request is received to restore a volume, the manifest of the most recent snapshot update is obtained, and the data objects are restored for the volume from the locations in the snapshot updates indicated by the manifest. The process 700 may be performed by the client virtual machine or host computing system attached to the volume.

In 702, a request is received to restore a volume to the state it was in at the time of its most recent snapshot update, generated in accordance with the present disclosure. For example, in a case where the volume was lost or corrupted due to a storage device failure it may be desirable to restore the volume to a new storage location. As another example, an unsanctioned software package may have been installed in the volume and it is desired by a customer owner of the volume to roll back the volume to a state prior to the installation of the software package. In still another example, it may be desired to duplicate the volume to another set of storage devices. The request may be received from a customer owner of the volume or from a computing resource service provider that provides the storage resources for the volume to the customer owner. Such computing resource service provider may provide an application programming interface to customers and/or system administrators for making the request. The application programming interface may receive as parameters, a volume identifier, and/or storage locations for the most recent manifest or snapshot of the volume. The application programming interface may also receive, as a parameter, the location to which the volume is to be restored. In some cases, the volume may be restored to the current location of the volume by overwriting the current volume with the restored volume. Note that it is also contemplated in 702 that, in some cases, it may be desired to restore only portions of the volume, rather than the entire volume. In such a case, the request may specify which data objects are to be restored.

In 704, the manifest of the most recent snapshot update is obtained. In some cases the manifest of the most recent snapshot update may have been generated and stored in persistent storage at a time during the process 500 or the process 600 of FIGS. 5 and 6 respectively. Alternatively, in some implementations, the manifest is generated in 704 in a process similar to the process 600. The manifest, as noted, may indicate the set of data objects (e.g., chunks of one or more blocks) to be restored and the locations of those data objects, such as the location of data objects within one or more of the snapshot updates, within a full base snapshot, on the volume, or some other storage location.

Once the manifest for the volume has been obtained, in 706, the system performing the process 700 may iterate through the set of data objects indicated in the manifest, and the location of each data object in the set of data objects may be obtained. In 708, each data object may be read or extracted from the location specified in the manifest for the data object and copied/written to the location where it is to be restored. In 710, the system performing the process 700 may determine whether the current data object being pointed to in the manifest is the last data object of the set of data objects to be restored. If not, the system performing the process 700 may return to 706 to locate, in the manifest, the next data object to be restored. Otherwise, if the iterative operations of 706-10 have reached the last data object of the set of data objects, the system may proceed to 712, whereupon the process 700 may end. Note that one or more of the operations performed in 702-12 may be performed in various orders and combinations, including in parallel.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 8:
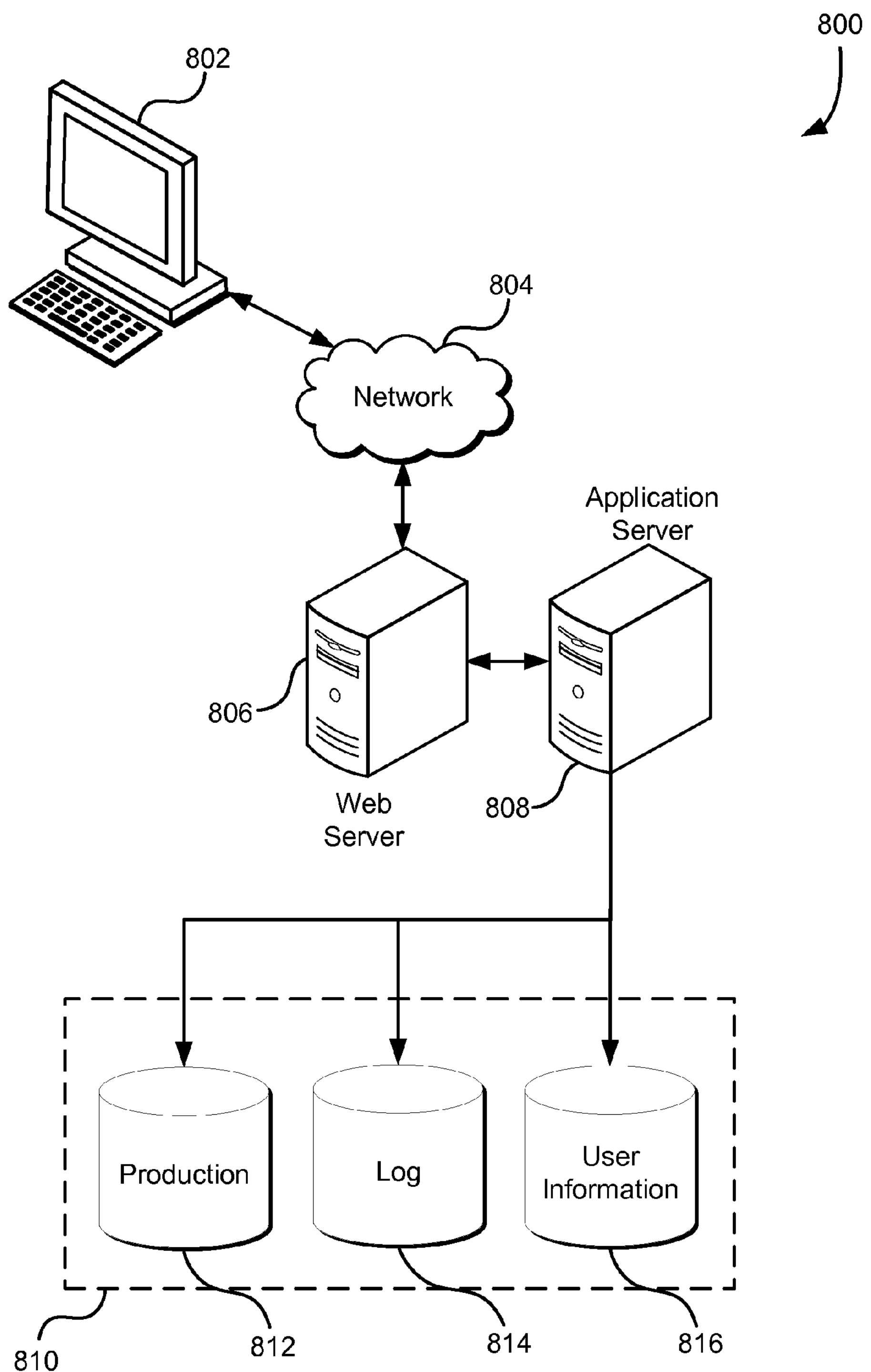
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 804 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 804 can be enabled by wired or wireless connections and combinations thereof. In this example, the network 804 includes the Internet, as the environment includes a web server 806 for receiving requests and serving content in response thereto, although for other networks an alternative device serving a similar purpose could be used as would be apparent to one of ordinary skill in the art.

The illustrative environment includes an application server 808 and a data store 810. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 808 can include any appropriate hardware, software and firmware for integrating with the data store 810 as needed to execute aspects of one or more applications for the electronic client device 802, handling some or all of the data access and business logic for an application. The application server 808 may provide access control services in cooperation with the data store 810 and is able to generate content including, text, graphics, audio, video and/or other content usable to be provided to the user, which may be served to the user by the web server 806 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 802 to provide the content in one or more forms including, forms that are perceptible to the user audibly, visually and/or through other senses including touch, taste, and/or smell. The handling of all requests and responses, as well as the delivery of content between the electronic client device 802 and the application server 808, can be handled by the web server 806 using PHP: Hypertext Preprocessor ("PHP"), Python, Ruby, Perl, Java, HTML, XML, or another appropriate server-side structured language in this example. It should be understood that the web server 806 and application server 808 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store 810 may include mechanisms for storing production data 812 and user information 816, which can be used to serve content for the production side. The data store 810 also is shown to include a mechanism for storing log data 814, which can be used for reporting, analysis or other purposes. It should be understood that there can be many other aspects that may need to be stored in the data store 810, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 808. In one example, a user, through a device operated by the user, might submit a search request for a certain type of item. In this case, the data store 810 might access the user information 816 to verify the identity of the user and can access the catalog detail information to obtain information about items of that type. The information then can be returned to the user, such as in a results listing on a web page that the user is able to view via a browser on the electronic client device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the example environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 804 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 804. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
under the control of one or more computer systems configured with executable instructions,
obtaining a snapshot manifest, the snapshot manifest including location information for a set of chunks of a data storage volume, the location information indicating an identity of a previous snapshot and a location of the chunk within the previous snapshot, each chunk of the set of chunks comprising one or more data storage units;
incrementing a snapshot count;
determining a first subset of chunks, the first subset of chunks comprising chunks of the set of chunks that are new or have changed since a time of a most recent previous snapshot;
determining, from the snapshot manifest, a second subset of chunks based at least in part on a snapshot depth and the snapshot count;
obtaining the first and second subsets of chunks;
generating at least a snapshot update of the set of chunks based at least in part on the obtained subsets of chunks; and
storing the at least a snapshot update of the set of chunks.

2. The computer-implemented method of claim 1, wherein the one or more data storage units are blocks of a block-level store provided through a block level storage service to a customer of a computing resource service provider.

3. The computer-implemented method of claim 1, the snapshot manifest is a first snapshot manifest and the method further comprises:
receiving a request to restore the set of chunks to a particular location;
obtaining a second snapshot manifest, the second snapshot manifest including locations of each chunk of the obtained first and second subsets of chunks in the at least a snapshot update; and
iterating through the locations of chunks indicated in the second snapshot manifest and copying the chunks from the indicated locations to the particular location.

4. The computer-implemented method of claim 1, wherein:
the at least a snapshot update is a first snapshot associated with a set of permissions for access to first snapshot; and
an entity that has been granted the set of permissions associated with the first snapshot is unable to access a second snapshot without having been granted a set of permissions associated with the second snapshot.

5. A system, comprising:
a volume comprising a set of objects;
one or more processors; and
memory including instructions that, when executed by the one or more processors, cause the system to:
obtain an upper limit for a plurality of active snapshots;
generate a set of snapshots by causing the system to iteratively:
determine a subset of the set of objects, the subset comprising:
a first subset comprising objects that have changed since a time of a previous snapshot; and
a second subset comprising objects associated with a predetermined portion of the volume, the predetermined portion based at least in part on the upper limit; and
generate and store the snapshots based at least in part on the determined subset of data objects; and
determine the plurality of active snapshots from the set of snapshots such that the set of objects is included in the plurality of active snapshots.

6. The system of claim 5, wherein:
the subset is the first subset; and
the instructions further include instructions that cause the system to:
receive a request to restore a second subset of the set of objects to a storage location; and
in response to receiving the request, obtain each object of the second subset from at least one of the plurality of active snapshots and store the object at the storage location.

7. The system of claim 5, wherein:
the snapshots of the plurality of active snapshots have associated sets of permissions for accessing the snapshot; and
an entity that has been granted a first set of permissions for accessing a first active snapshot of the plurality of active snapshots is unable to access a second active snapshot without having been granted a second set of permissions associated with the second active snapshot.

8. The system of claim 5, wherein the instructions that cause the system to generate and store each snapshot include instructions that cause the system to:
obtain the first subset of objects from the volume;
obtain the second subset of objects, wherein at least a portion of the second subset of objects is obtained from a previously generated active snapshot of the plurality of active snapshots;

generate the snapshot based at least in part on the obtained first and second subsets of objects; and store the snapshot.

9. The system of claim 5, wherein the plurality of active snapshots are stored in random access storage.

10. The system of claim 5, wherein the instructions that cause the system to determine the subset of the set of objects include instructions that cause the system to obtain a manifest that indicates an identity and location for each object required to restore the volume to a state of the volume at a time corresponding to the snapshot, the manifest comprising:

a first identity and location in the volume for each object in the first subset of objects; and a second identity and location in the plurality of active snapshots for each object in the second subset of objects.

11. The system of claim 5, wherein the instructions further include instructions that cause the system to:

receive a request through an application programming interface to change the upper limit; and change the upper limit in accordance with the request.

12. The system of claim 5, wherein each object of the set of objects comprises one or more blocks of a block-level store.

13. A non-transitory computer-readable storage medium having stored thereon executable instructions that, when executed by one or more processors of a computer system, cause the computer system to at least:

determine a first set of blocks including blocks that have changed since a time of a previous snapshot;

determine a second set of blocks based at least in part on a predetermined amount;

generate at least one snapshot update of a volume based at least in part on a combination of the first set of blocks and the second set of blocks; and store the at least one snapshot update.

14. The non-transitory computer-readable storage medium of claim 13, wherein the instructions further include instructions that, when executed by the one or more processors, cause the computer system to:

receive a request to restore at least a portion of a volume to a previous state; and as a result of receiving the request:

determine a third set of blocks comprising the volume, the third set of blocks including one or more blocks from the combination of the first set of blocks and the second set of blocks;

obtain the third set of blocks in part from the at least one snapshot update; and restore the volume by storing the obtained third set of blocks.

15. The non-transitory computer-readable storage medium of claim 13, wherein the first set and the second set are disjoint sets.

16. The non-transitory computer-readable storage medium of claim 13, wherein the instructions that cause the computer system to generate the at least one snapshot update include instructions that cause the computer system to:

obtain the first set of blocks from a volume of blocks;

obtain the second set of blocks, wherein at least a subset of the second set of block are obtained from a previously generated snapshot update; and generate the at least one snapshot update at least in part from the obtained first and second sets of blocks.

17. The non-transitory computer-readable storage medium of claim 13, wherein the instructions that cause the computer system to determine the second set of blocks further include instructions that cause the computer system to exclude a block from the second set of blocks if the determined first set of blocks includes a same block as the block or newer version of the block.

18. The non-transitory computer-readable storage medium of claim 13, wherein the instructions further include instructions that cause the computer system to, based at least in part on a determination that generating and storing the at least one snapshot update would exceed a time threshold, increase a snapshot depth.

19. The non-transitory computer-readable storage medium of claim 13, wherein the instructions that cause the computer system to, based at least in part on a determination that network demand has fallen below a minimum threshold, decrease a snapshot depth.

20. The non-transitory computer-readable storage medium of claim 13, wherein the instructions that cause the computer system to determine the second set of blocks include instructions that cause the computer system to:

increment a snapshot count;

obtain a manifest that includes an entry for each block of the volume; and determine the second set of blocks based at least in part on the manifest, the snapshot count, and a snapshot depth.

* * * * *